US012705871B2

(12) United States Patent
Redford et al.

(10) Patent No.: US 12,705,871 B2
(45) Date of Patent: Aug. 11, 2026

(54) EXTRACTING FEATURES FROM SENSOR DATA

(71) Applicant: Five AI Limited, Cambridge (GB)

(72) Inventors: John Redford, Cambridge (GB); Sina Samangooei, Cambridge (GB); Anuj Sharma, Cambridge (GB); Puneet Dokania, Cambridge (GB)

(73) Assignee: Five AI Limited, Cambridge (GB)

( * ) Notice: Subject to any disclaimer, the term of this patent is extended or adjusted under 35 U.S.C. 154(b) by 275 days.

(21) Appl. No.: 18/272,849

(22) PCT Filed: Jan. 19, 2022

(86) PCT No.: PCT/EP2022/051145
§ 371 (c)(1),
(2) Date: Jul. 18, 2023

(87) PCT Pub. No.: WO2022/157201
PCT Pub. Date: Jul. 28, 2022

(65) Prior Publication Data
US 2024/0104913 A1 Mar. 28, 2024

(30) Foreign Application Priority Data
Jan. 20, 2021 (GB) ...................................... 2100740

(51) Int. Cl.
*G06V 10/00* (2022.01)
*G06V 10/77* (2022.01)
*G06V 10/82* (2022.01)

(52) U.S. Cl.
CPC .......... *G06V 10/82* (2022.01); *G06V 10/7715* (2022.01)

(58) Field of Classification Search
CPC .... G06V 10/82; G06V 10/7715; G06V 20/56; G06V 10/70; G06N 3/045; G06N 3/088;
(Continued)

(56) References Cited

U.S. PATENT DOCUMENTS 11,481,626 B2 10/2022 Das et al.
11,494,597 B2 11/2022 Nadamuni Raghavan et al.
(Continued)

FOREIGN PATENT DOCUMENTS

WO 2019/178702 A1 9/2019

OTHER PUBLICATIONS

Beker et al, Monocular Differentiable Rendering for Self-Supervised 3D Object Detection, arXiv:2009.14524v1 (Year: 2020).*
(Continued)

*Primary Examiner* — Xiao Liu
(74) *Attorney, Agent, or Firm* — Greenberg Traurig, LLP

(57) ABSTRACT

A computer implemented method of training an encoder to extract features from sensor data comprises training a machine learning (ML) system based on a self-supervised loss function applied to a training set, the ML system comprising the encoder. The training set comprises first data representations and corresponding second data representations, wherein the encoder extracts features from each first and second data representation, and wherein the self-supervised loss function encourages the ML system to associate each first data representation with its corresponding second data representation based on their respective features. Each first data representation and its corresponding second data representation represent a common set of sensor data, and at least the second data representation is generated by: applying a 2D object detector to an image other than the first and second data representations, wherein the image contains or is associated with the common set of sensor data, and transforming the common set of sensor data based one or more objects detected in the image, the second data representation representing the transformed sensor data.

17 Claims, 6 Drawing Sheets

Generating positive pairs via 2D object cropping

(58) Field of Classification Search
CPC . G06T 2207/10024; G06T 2207/10028; G06T 2207/20081; G06T 2207/20084; G06T 7/11
See application file for complete search history.

(56) References Cited

U.S. PATENT DOCUMENTS

| | | | | |
|---|---|---|---|---|
| 11,663,486 | B2 | 5/2023 | Sun et al. | |
| 2017/0304732 | A1* | 10/2017 | Velic | G06V 10/774 |
| 2019/0383904 | A1 | 12/2019 | Harrison | |
| 2021/0012166 | A1* | 1/2021 | Braley | G06F 18/251 |
| 2021/0096241 | A1* | 4/2021 | Bongio Karrman | G06V 10/82 |
| 2021/0326751 | A1 | 10/2021 | Liu et al. | |
| 2021/0327029 | A1* | 10/2021 | Chen | G06T 5/70 |
| 2021/0406674 | A1* | 12/2021 | Wu | G06N 3/04 |
| 2023/0214654 | A1 | 7/2023 | Park et al. | |
| 2025/0013912 | A1 | 1/2025 | Jansson Minne et al. | |

OTHER PUBLICATIONS

Cosma et al, Self-Supervised Representation Learning on Document Images, DAS 2020: IAPR International Workshop on Document Analysis Systems (Year: 2020).*
Chen et al, Multi-View 3D Object Detection Network for Autonomous Driving, CVPR (Year: 2017).*
Yang et al, PIXOR: Real-time 3D Object Detection from Point Clouds, CVPR (Year: 2018).*
Zakharov et al, Autolabeling 3D Objects with Differentiable Rendering of SDF Shape Priors. In CVPR (Year: 2020).*
European Examination Report from related European Application No. 22704296.7, dated Jun. 28, 2024 (7 pages).
Comer Joseph F et al: "SAR automatic target recognition with less labels", SPIE Proceedings [Proceedings of SPIE ISSN 0277-786X], SPIE, US, vol. 11394, Apr. 24, 2020 (Apr. 24, 2020), pp. 113940Q-113940Q, XP060132528, DOI: 10.1117/12.2564875 ISBN: 978-1-5106-3673-6 (11 pages).
U.S. Appl. No. 18/272,950, filed Jul. 18, 2023, Redford et al.
U.S. Appl. No. 18/272,916, filed Jul. 18, 2023, Redford et al.
U.S. Appl. No. 18/272,970, filed Jul. 18, 2023, Redford et al.
International Search Report; PCT/EP2022/051145; Date: May 16, 2022; By: Authorized Officer: Grigorescu, Simona.
Xie Saining et al, "PointContrast: Unsupervised Pre-training for 3D Point Cloud Understanding", Dec. 3, 2020 (Dec. 3, 2020), Computer Vision—ECCV 2020 : 16th European Conference, Glasgow, UK, Aug. 23-28, 2020 : Proceedings; [Lecture Notes in Computer Science ; ISSN 0302-9743], pp. 574-591; ISBN: 9783030585945; Sections 3.2, 3.4, 3.4, and 4.3; Algorithm 1;abstract.
Bozorgtabar Behzad et al, "SynDeMo: Synergistic Deep Feature Alignment for Joint Learning of Depth and Ego-Motion", 2019 IEEE/CVf International Conference on Computer Vision (ICCV), IEEE,Oct. 27, 2019 (Oct. 27, 2019), p. 4209-4218.
Eric Tzeng et al, "Adapting Deep Visuomotor Representations with Weak Pairwise Constraints", May 25, 2017 (May 25, 2017), URL:https://arxiv.org/pdf/1511.07111.pdf.
Bin Cheng et al, "S3Net: Semantic-Aware Self-supervised Depth Estimation with Monocular Videos and Synthetic Data", arxiv.org, Cornell University Library, 201 Olin Library Cornell University Ithaca, NY 14853,Jul. 29, 2020 (Jul. 29, 2020).
Ting Chen et al, "A Simple Framework for Contrastive Learning of Visual Representations", arxiv.org, Cornell University Library, 201 Olin Library Cornell University Ithaca, NY 14853,Jul. 1, 2020 (Jul. 1, 2020).
Zhang Bin et al, "Multi-Task Deep Transfer Learning Method for Guided Wave-Based Integrated Health Monitoring Using Piezoelectric Transducers", Jul. 21, 2020 (Jul. 21, 2020), vol. 20, No. 23, p. 14391-14400.
Wenhao Wang et al, "DomainMix: Learning Generalizable Person Re-Identification Without Human Annotations", arxiv.org, Cornell University Library, 201 Olin Library Cornell University Ithaca, NY 14853,Nov. 24, 2020 (Nov. 24, 2020).
U.S Office Action dated Jul. 11, 2025, from related U.S. Appl. No. 18/272,970.
U.S Office Action dated Oct. 23, 2025, from related U.S. Appl. No. 18/272,916.
Yingzi Ma, Self-Supervised Learning of 3D Point Clouds via Feature Transformation and Rotation Prediction, Nov. 2022, 2022 International Conference on Electrical, Computer, Communications and Mechatronics Engineering (Year: 2022).
Qiangeng Xu et. al., Grid-GCN for Fast and Scalable Point Cloud Learning, 2020, Proceedings ofthe IEEE/CVF Conference on Computer Vision and Pattern Recognition, pp. 5661-5670 (Year: 2020).
Michael Goersele et. al., Ambient Point Clouds for View Interpolation, Jul. 2010, SIGGRAPH'10: ACM SIGGRAPH 2010 papers, article No. 95, pp. 1-6 (Year: 2010).
Haoming Lu et. al., Deep Learning for 3D Point Cloud Understanding: A Survey, Sep. 2020, Computer Vision and Pattern Recognition, Machine Learning (Year: 2020).

* cited by examiner

Generating positive pairs via 2D object cropping

Contrastive learning

EXTRACTING FEATURES FROM SENSOR DATA

CROSS-REFERENCE TO RELATED APPLICATIONS

This application is the U.S. National Stage application, pursuant to 35 U.S.C. § 371, of PCT International Patent Application No. PCT/EP2022/051145, filed Jan. 19, 2022, designating the United States and published in English, which claims priority under 35 U.S.C. §§ 119 and 365 to Great Britain Patent Application No. 2100740.6, filed Jan. 20, 2021. The contents of each of the aforementioned applications are incorporated herein by reference in their entirety.

TECHNICAL FIELD

The present disclosure pertains generally to feature extraction, and in particular to training methods that can learn to extract useful features from sensor data, as well as trained feature extractors that can be applied to sensor data.

BACKGROUND

Broadly speaking, supervised machine learning (ML) aims to learn some function given only examples pairs of inputs and outputs $(\tilde{x}, \tilde{y})$ (the training set $\{(\tilde{x}, \tilde{y})\}$). Here, "$\tilde{x}$" is a training input, and "$\tilde{y}$" is variously termed a label, annotation or ground truth. Denoting an ML model as $f(x; w)$, the model computes an output $y=f(x; w)$ for some input x based on a set of learned parameters w. During training, the aim is to learn values of the parameters w that substantially match the outputs of the ML model, $y=f(\tilde{x}; w)$, to the labels, $\tilde{y}$, across the training set $\{(\tilde{x}, \tilde{y})\}$. The model is said to generalize from the training set, in that, once trained, it can be meaningfully applied to an unlabelled input not encountered during training.

A broad application of ML is perception. Perception means the interpretation of sensor data of one or more modalities, such as image, radar and/or lidar. Perception includes object recognition tasks, such as object detection, object localization and class or instance segmentation. Such tasks can, for example, facilitate the understanding of complex multi-object scenes captured in sensor data. Computer-implemented perception tasks are widely applicable across a range of technical fields. For example, perception is a critical component of autonomous vehicle (AV) systems and advanced driver-assistance systems (ADAS).

State-of-the-art performance on computer-implemented perception tasks has been achieved via machine learning (ML), with many key performance gains attributed to deep convolutional neural networks (CNNs) trained on very large data sets.

Computer vision (CV)—the interpretation of image data—is a subset of perception. Recent years have seen material developments in ML applied to image recognition and other CV tasks. A key benchmark is provided by the ImageNet database, containing millions of images annotated with object classes. Breakthrough performance on the ImageNet challenge was achieved by AlexNet in 2012, a convolutional neural network (CNN) trained on GPU hardware. Since then, CNN architectures have continued to set the bar for state-of-the-art performance for image classification tasks.

A challenge with CNNs and deep networks is the need for large amounts of training data—typically hundreds of thousands or millions of annotated training images are needed to achieve state-of-the-art performance. Moreover, the complexity of the training data increases with the complexity of the task to be learned: for basic image classification (classifying whole images), simple class labels are sufficient; but more involved tasks require more complex annotation, such as annotated bounding boxes for object recognition or per-pixel classifications for image segmentation.

"Shared learning" techniques, such as transfer learning or multi-task learning, go some way to addressing these issues. Shared learning seeks to share learned knowledge across multiple tasks. For example, this may involve the learning of robust feature representations of sensor data (features) that are shared between multiple tasks. Learning of such feature representations may be referred to as "representation learning" or "feature learning".

In transfer learning, an ML system is initially trained on a first task (the "pre-training" or "pretext" phase), and subsequently trained on a second task in a way that incorporates knowledge learned in the training on the first task ("fine-tuning"). Feature leaning occurs in the pre-training phase, and the learned features are used to learn and perform the second task. The first task may be referred to as a "dummy" task because it is often the second task (the desired task) that is of interest in this context. An ML system might comprise a first component, variously termed the encoder, body or feature extractor, and a second component, sometimes termed the head. In high-level terms, the encoder receives an input (such as an image or images), processes the input to extract features, and passes the features to the head, which in turn processes those features in order to compute an output. In pre-training, the encoder may be connected to a "dummy" head, and the dummy head and the encoder might be trained simultaneously on the dummy task using annotated training inputs commensurate with the dummy task. In pre-training, the aim is to match the outputs of the dummy head to the annotations. In computer vision, that first task might be a simple image classification task; although this will generally require a large volume of training data, the form of annotation (per-image class labels) is relatively simple, reducing the annotation burden. Because the encoder and the head are trained simultaneously, it is not only parameters of the head that that are optimized—the encoder also learns parameters for extracting optimal features for the classification task at hand (a form of feature learning). After pre-training, the dummy head might be discarded, and the now-trained encoder connected to a new and as-yet untrained head. In fine turning, the encoder parameters learned in pre-training on the dummy task (e.g., image classification) may be frozen, with only the parameters of the new head being optimised on the desired second task. The desired task could, for example, be an object detection task such as object localization, e.g., bounding box detection (predicting bounding boxes around objects), or image segmentation (predicting individual object pixels), requiring annotated 2D bounding boxes (or object localization ground truth more generally) and annotated segmentation masks respectively. Although the features have been learned through training on the dummy task, the assumption is that, by choosing an appropriate dummy task, the knowledge encoded in the pre-trained encoder weights should be largely applicable to the desired task as well; the features extracted by the pre-trained encoder should, therefore, be useful to the new head in performing the desired task, significantly reducing the amount of training data required to train the new head. For example, once a network has been pre-trained on a suitable classification task, it can be fine-tuned to bounding box detection or image segmentation with only a relatively small number of annotated bounding boxes or annotated segmentation masks. The effectiveness of transfer learning in image processing has been demonstrated on various image processing tasks in recent years.

Multi-task learning is another shared learning approach. Rather than separating pre-training from fine-tuning, in multi-task learning, a machine learning system is trained simultaneously on multiple tasks. In practice, this typically involves some shared encoder architecture—for example, a dummy head and a desired head may each be connected to a shared encoder, with the heads and the encoder trained simultaneously on dummy and desired tasks though optimization of an appropriate multi-task loss.

It will be appreciated that the terms "dummy" and "desired" are merely convenient labels—the terminology does not necessarily imply that the dummy task is trivial or useless (that may or may not be the case). Rather, all that terminology implies some mechanism (including but not limited to transfer learning and multitask learning) by which knowledge learned in training on some first task (the dummy task) is shared in the learning of some second task (the desired task). In this context, the term "feature learning" refers to the training of the encoder (whether through pre-training on the encoder and dummy head, multi-task training on the encoder, dummy head and desired head simultaneously or some any other shared learning approach in which encoder parameters are learned).

In computer vision, many developments in transfer learning have leveraged supervised pre-training on large, manually annotated image sets such as ImageNet. There are various examples of successful transfer learning approaches with ImageNet features; that is, features learned from the 14 million or so "generic" images in the ImageNet database that have been manually annotated in respect of over 20,000 image classes. However, despite those successes, supervised feature learning approaches are inherently limited in their reliance on manually annotated features.

"Self-supervised" approaches seek to address these issues. Self-supervised learning mirrors the framework of supervised learning, but with the aim of removing or reducing the need for manual annotations by deriving the ground truth, $\tilde{y}$, for the dummy task automatically, i.e., given a set of training inputs $\{\tilde{x}\}$, to automatically generate a training set $\{(\tilde{x}, \tilde{y})\}$ for the dummy task without manual annotation. Outside of perception, an example of a successful self-supervised approach is the Word2Vec model the field of Natural Language Processing (NLP). In training, each input, x, is a word taken from a training document, and the ground truth, $\tilde{y}$, is derived automatically as a set of adjacent words; in training the task is, therefore, to learn to predict likely adjacent words given an input word. This approach has been demonstrated to be highly effective at learning semantically rich features for words that can then be applied to other tasks such as document classification.

Whilst self-supervised feature-learning tasks have also been explored in computer vision, they have been largely unable to match the performance of pre-training on the manually annotated ImageNet images.

The "SimCLR" architecture is a recent and promising development in self-supervised feature learning for computer vision. For further details, see "A Simple Framework for Contrastive Learning of Visual Representations", Chen et. al. (2020); arXiv:2002.05709, incorporated herein by reference in its entirety. SimCLR adopts a "contrastive learning" approach, where training data is generated automatically via image transformations. A stochastic data augmentation module transforms a given image randomly resulting in two correlated "views" of the image, $\tilde{x}_i$ and $\tilde{x}_j$. Those views are said to be "associated" and constitute a "positive pair". The training also uses "negative" image pairs that are not expected to have any particular association with each other. The self-supervised task is that of identifying positive pairs. That task is encoded in a contrastive loss function that encourages the network to extract similar features for two images of a positive pair, whilst discouraging similarity of features for two images of a negative pair.

Developments in self-supervision for perception have mainly focused on images. Self-supervised feature learning for 3D data has seen only limited attention. Some of this research is limited to the use of single object data for pre-training and typically relies on synthetic 3D data such as single-object CAD models. The "ShapeNet" database is a repository of annotated 3D CAD models which have been used for feature learning.

Xie et al. "PointContrast: Unsupervised Pre-training for 3D Point Cloud Understanding" (2020) considers representation learning from 3D point clouds containing complex multi-object scenes. A network is pre-trained on complex scenes with multiple objects, on a pretext task of contrasting, at the point level, between two transformed point clouds. A VoteNet architecture is chosen because it is designed to work directly on point clouds with no additional image input.

SUMMARY

To date, the pair generation functions considered in contrastive learning have been relatively primitive. These typically involve basic geometric transformations (such as random cropping, rotation, rescaling etc.) or other transformation such as the addition of random noise or colour distortion.

By contrast, a novel pair generation function is disclosed herein that is guided by 2D object detection.

A first aspect herein provides a computer implemented method of training an encoder to extract features from sensor data, the method comprising:

training a machine learning (ML) system based on a self-supervised loss function applied to a training set, the ML system comprising the encoder;

wherein the training set comprises first data representations and corresponding second data representations, wherein the encoder extracts features from each first and second data representation, and wherein the self-supervised loss function encourages the ML system to associate each first data representation with its corresponding second data representation based on their respective features;

wherein each first data representation and its corresponding second data representation represent a common set of sensor data, and at least the second data representation is generated by:

applying a 2D object detector to an image other than the first and second data representations, wherein the image contains or is associated with the common set of sensor data, and transforming the common set of sensor data based one or more objects detected in the image, the second data representation representing the transformed sensor data.

For example, with a 3D point cloud encoded in the depth channel of an RGBD (red green blue depth) image, 2D object detector could be used to detect object(s) in the image plane of the RGBD image. A bird's-eye-view (BEV) representation of the point cloud can be determined by projecting pixels of the RGBD image into the BEV plane using the values of the depth channel (D). The points belonging to the object(s) in the BEV plane are known from the 2D object detector output. In order to generate a positive pair of BEV images, a transformed BEV image can be generated in a way that uses the knowledge of the object points in the BEV plane. For example, background (non-object) points could be removed from the transformed image (and optionally replaced with random noise).

The same principles apply to other modalities of point cloud, such as lidar or radar; in this case, an image may be captured substantially simultaneously with the lidar or radar point cloud. 2D bounding boxes detected in the image can, in turn, be projected into the space of the lidar/radar point cloud, allowing object/non-object points to be identified in the same way.

The 2D object detector could, itself, be a trained ML 2D object detector. In that case, the above training method provides a structured way to transfer knowledge learned in the training of the 2D object detector to the encoder, e.g., for use in extracting features from point clouds, or BEV representations thereof.

Herein, the term data representation refers to some lower-level representation of the sensor data or some transformed version thereof, and includes, for example, image, point cloud, voxel or mesh representations and the like. The term "input" is used as shorthand for such a data representation unless otherwise indicated. By contrast, a feature representation refers to some higher-level representation extracted by the encoder. When the term representation is used without modification, the meaning shall be apparent from the context. Terms such as feature learning and representation learning are used as shorthand to refer to the training of the encoder based on the dummy task unless otherwise indicated.

In embodiments, the common set of sensor data may comprise a point cloud that is encoded in a depth channel of the image and is thus represented in a 2D image plane of the image.

In that event, the first and second data representations may, for example, represent the point cloud in a 2D plane other than the image plane of the image.

The first and second data representations may, for example, be discretised image representation of the point cloud in the 2D plane that optionally include respective height channels.

The 2D plane may, for example, be a bird's-eye view plane lying substantially perpendicular to the 2D image plane.

Alternatively, the first and second data representations may represent the point cloud in 3D space.

The first and second data representations may, for example, discretised voxel representations of the point cloud in 3D space, or non-discretised representations of the point cloud in 3D space.

The image may have been captured substantially simultaneously with the common set of sensor data, the sensor data of a non-image modality. Each detected object may be matched with a corresponding subset of the common set of sensor data in order to transform the common set of sensor data.

The common set of sensor data may comprise a point cloud not encoded in the image. For example, the point cloud may have a non-image modality (e.g. lidar or radar).

The common set of sensor data may be transformed by removing or distorting background sensor data that does not belong to any detected object.

For example, the 2D object detector may compute a 2D bounding box for each detected object, and the background sensor data may be identified as sensor data contained in or associated with a background region of the image outside of any 2D bounding box.

The background sensor data may be, for example, fully or partially removed and replaced with random noise.

The ML system may comprise a trainable projection component which projects the features from a feature space into a projection space, and the self-supervised loss may be defined on the projected features. The trainable projection component may be trained simultaneously with the encoder.

Each set of sensor data may, for example, capture a static or dynamic driving scene.

The common set of sensor data may comprise 3D spatial data, or 2D spatial data in a 2D plane other than an image plane of the image.

The 2D object detector may be a trained machine learning (ML) 2D object detector, whereby knowledge learned in the training of the 2D ML object detector is transferred to the encoder during the training based on the self-supervised loss function.

A second aspect herein provides an encoder trained in accordance with the method of the first aspect or any embodiment thereof.

A third aspect herein provides a computer system comprising such an encoder and a perception component. The encoder is configured to receive an input sensor data representation and extract features therefrom, and the perception component is configured to use the extracted features to interpret the input sensor data representation.

A fourth aspect herein provides a training computer program configured, when executed on one or more computer processors, to implement the method of the first aspect or any embodiment thereof.

According to another aspect herein, a computer implemented method of training an encoder to extract features from 3D sensor data comprises:

- receiving multiple sets of 3D sensor data;
- generating a training image set, the training image set comprising multiple image representations of each set of 3D sensor data, the image representations capturing respective views of a complex multi-object scene of the 3D sensor data; and
- training a machine learning (ML) system based on a self-supervised loss function applied to the training image set, the ML system comprising the encoder;
- wherein the encoder of the ML system extracts features from each image representation of the training image set, wherein the self-supervised loss function encourages the ML system to mutually associate image representations of the same set of 3D sensor data based on their respective features.

In embodiments, for each set of 3D sensor data, at least a first of the image representations may be generated by: modifying the 3D sensor data and projecting the modified 3D object into a first image plane of the image representation.

Said modifying of the sensor data may comprise selectively removing non-object points therefrom.

The non-object points may be identified by applying 2D object detection to the 3D sensor data in a second image plane, the modified sensor data projected from the second image plane into the first image plane.

The self-supervised loss function may encourage the ML system to mutually associate image representations of the same set of 3D sensor data by encouraging similarity between their respective features.

Each set of 3D sensor data may be in the form of a point cloud, such as a lidar point cloud or radar point cloud. The point cloud may be unordered and non-discretised.

BRIEF DESCRIPTION OF FIGURES

For a better understanding of the present disclosure, and to show how embodiments of the same may be carried into effect, reference is made by way of example only to the following figures in which.

DETAILED DESCRIPTION

As discussed, shared learning approaches seek to learn feature representations that generalize to other tasks. The following examples consider a pre-training (pretext)/fine-tuning scheme, but it will be appreciated that the principles apply equally to other shared learning approaches such as multi-task learning.

Figure 1:
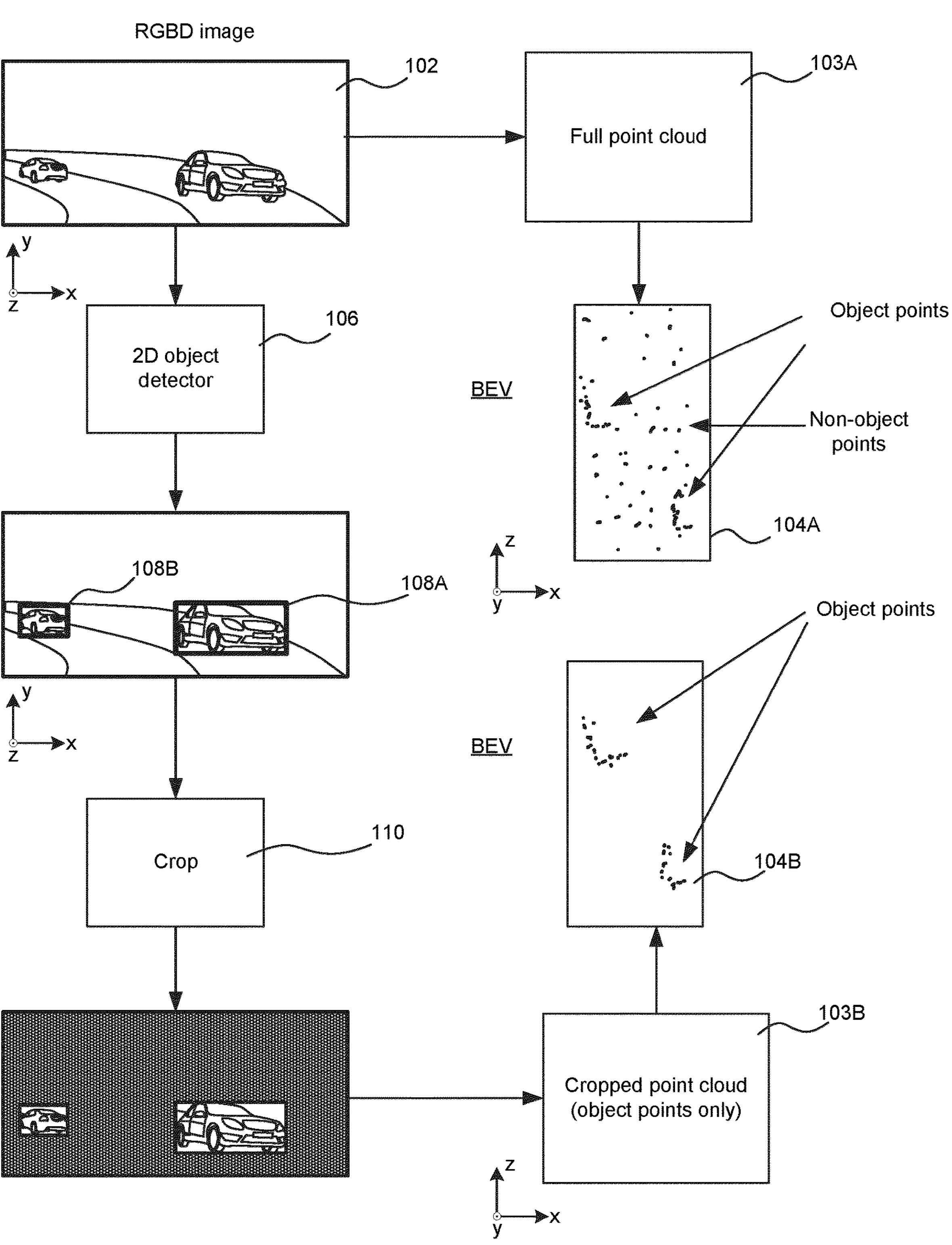
FIG. 1 shows a schematic block diagram of a system for generating paired training inputs.

FIG. 1 shows a schematic block diagram of a system for generating training inputs for a contrastive learning pretext task.

An RGBD (Red Green Blue Depth) image is denoted by reference numeral 102. An RGBD image is a two-dimensional (2D) image representation, in the sense of a 2D array of pixels, but one that explicitly encodes 3D spatial information via a depth channel (D). The depth channel assigns a depth or disparity value to each pixel (or at least some of the pixels) indicating the depth (distance from the image plane) of a corresponding point in 3D space, in addition to the colour values of the RGB channels.

As used herein, unless otherwise indicated, the term "3D image" refers to a 2D image representation that explicitly encodes 3D spatial information. Examples of such 3D images include depth images (with or without colour channel(s)), RGBD images and the like.

The depth channel of the RGBD image 102 encodes a 3D point cloud 103A, i.e., a set of points in 3D space. For example, in a stereo imaging context, the depth channel of the RGBD image 102 may contain pixel disparities, which can be transformed to units of distance based on a known stereo camera geometry. Alternatively, the depth channel may encode pixel depth values in units of distance, thus representing each point of the point cloud 103A directly in 3D space.

In order to provide a paired training input, the original RGBD image 102 is passed to a 2D object detector 106. The 2D object detector 106 operates on one or more channels of the RGBD image 102, such as the depth channel (D), the colour (RGB) channels or both. For the avoidance of doubt, the "2D" terminology refers to the architecture of the 2D object detector, which is designed to operate on dense, 2D image representations, and does not exclude the application of the 2D object detector to the depth channel or to a 3D image (in the above sense) more generally.

In this example, the 2D object detector 106 takes the form of a 2D bounding box detector that outputs a set of 2D bounding boxes 108A, 108B for a set of objects detected in the RGBD image 102. This, in turn, allows object points, corresponding to pixels that are contained within one of the 2D bounding boxes 108A, 108B, to be distinguished from non-object point that correspond to pixels not contained within any 2D bounding box 108A, 108B.

A cropping component 110 uses the 2D bounding boxes 108A, 108B to generate a "cropped" point cloud 103B containing only object points.

The cropped point cloud 103B and the full point cloud 103A of the same RGBD image 102 constitute a positive pair for the purpose of contrastive learning.

FIG. 1 depicts first and second birds-eye-view (BEV) images 104A, 104B of the full and cropped point clouds 103A, 103B respectively. The BEV images 104A, 104B are transformed versions of the original RGBD image 102, projected into a different image plane.

In the example depicted, the original RGBD image 102 is shown to capture a relatively complex multi-object scene of the kind that that might be encountered by a sensor-equipped vehicle. The RGBD image 102 captures a view of the scene in a generally vertical image plane. For convenience, a cartesian coordinate system is defined with the image plane of the original RGBD image 102 lying parallel to the x-y plane, and the z-direction perpendicular to it. The BEV plane of the transformed images 104A, 104B lies substantially parallel to the x-z plane, and each of those images represents a version of the scene in the BEV plane.

The BEV images 104A, 104B are discretised BEV representations of the paired point clouds 104A, 104B. For the purposes of illustration, the following examples consider training inputs in the form of image representations of point clouds, i.e., sensor data represented in a structured two-dimensional (2D) pixel array. As noted above, a 2D image representation does not necessarily exclude the presence of explicitly encoded 3D spatial information. For example, a PIXOR representation of a 3D point cloud is a BEV image representation of that uses occupancy values to indicate the presence or absence of a corresponding point in the point cloud and, in some case, height values to fully represent the points of the point cloud (similar to the depth channel of an RGBD image). For further details, see Yang et al, "PIXOR: Real-time 3D Object Detection from Point Clouds", arXiv: 1902.06326, which is incorporated herein by reference in its entirety.

FIG. 1 shows the paired image 104B without any background points.

Figure 1A:
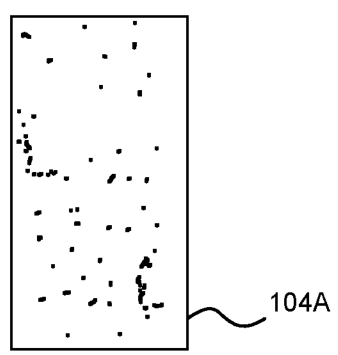
FIG. 1A shows a block schematic block diagram of a pair generation function implemented via cropping of background point and injection of random background noise.
Figure 1A:
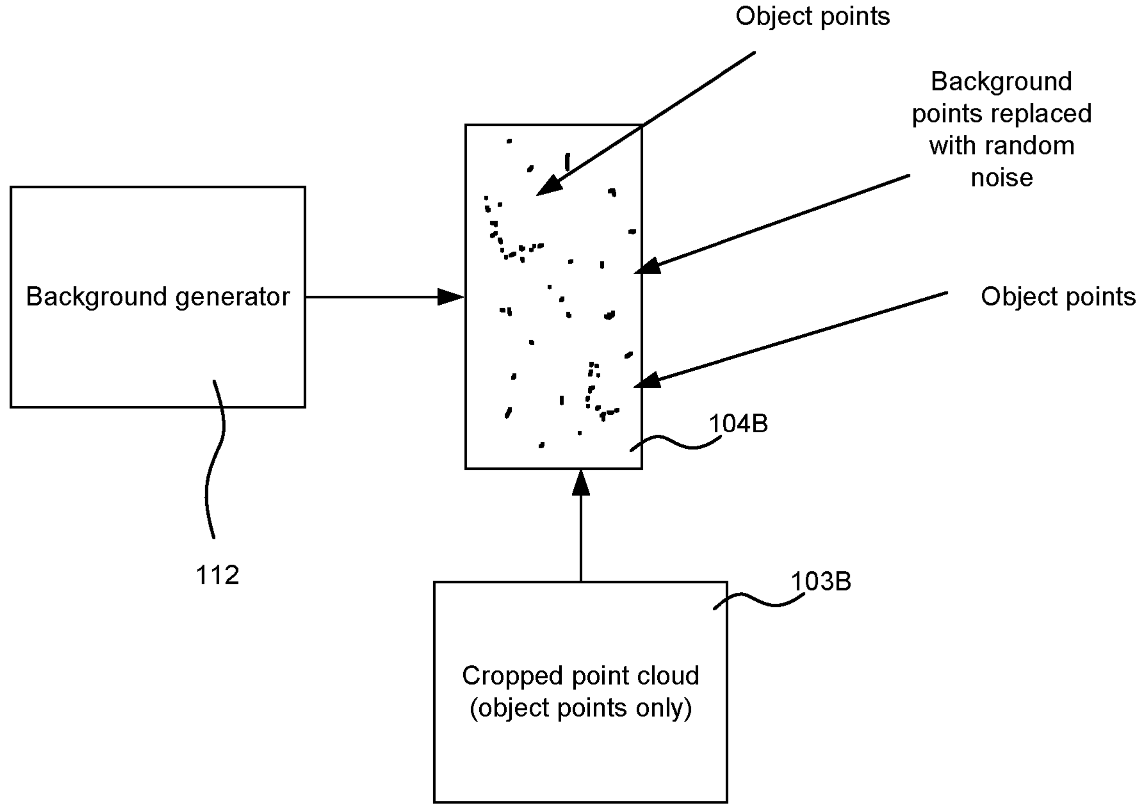

FIG. 1A shows an extension of the system, in which a background generator 112 inserts randomly generated noise into the second image 104A in place of the removed object points. The random noise has a similar density to the original background points in the first image 104A. The addition of random background noise makes the two images 104A, 104B appear more similar, and may be able to improve performance of the encoder 100 on the contrastive learning task.

Figure 2:
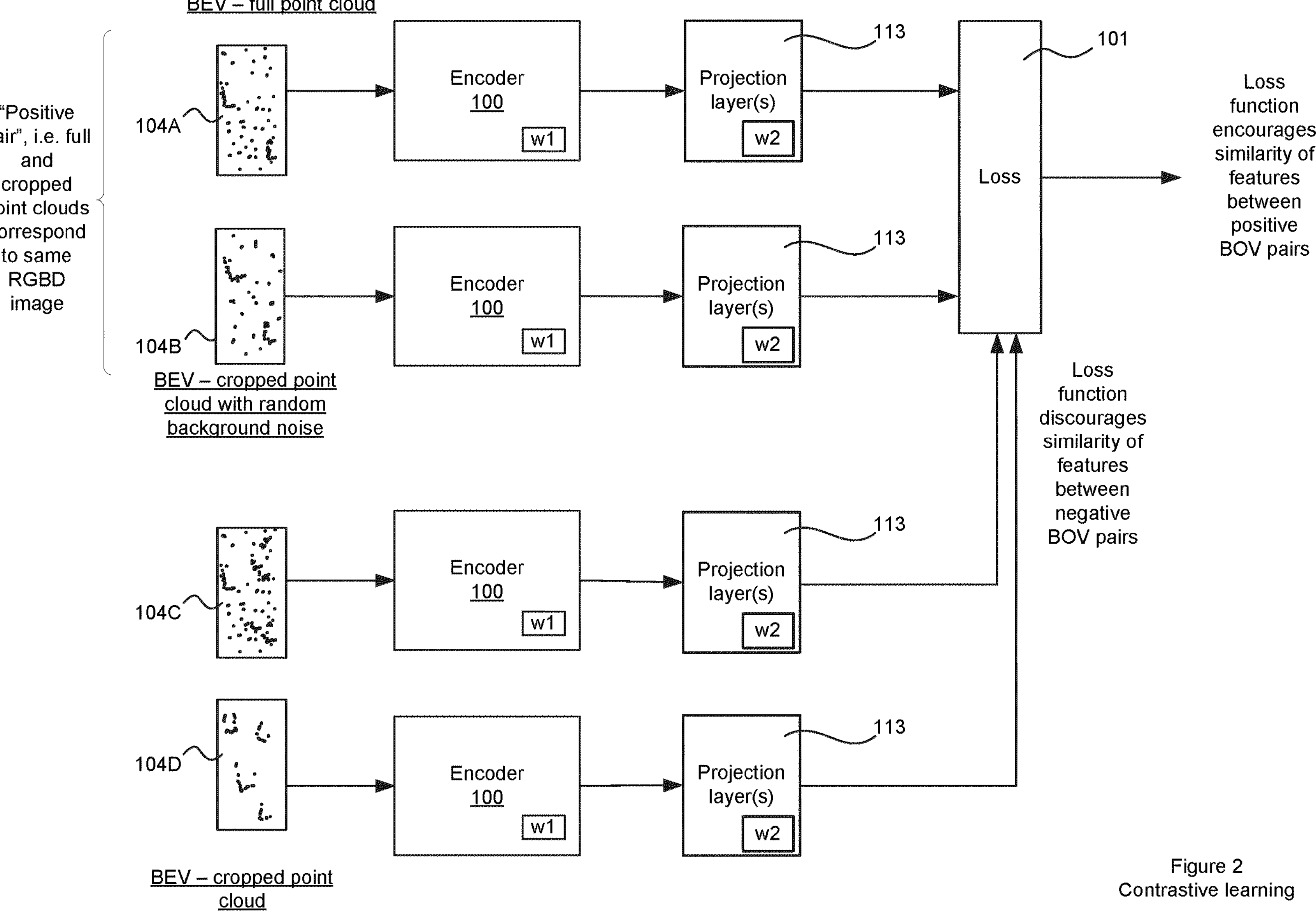
FIG. 2 shows a schematic block diagram of a contrastive learning pretext training architecture.

FIG. 2 shows a schematic block diagram of a contrastive learning architecture applied to BEV images generated according to the principles of FIG. 1. An encoder 100 receives a BEV image as input and processes the input image based on a set of encoder weights w 1. In a pre-training phase, the encoder weights w 1 are learned via pre-training on a pretext contrastive learning task.

For the contrastive learning task, the first and second BEV images 104A, 104B of FIG. 1 are associated images corresponding to the same RGBD image 102. The first and second images 104A, 104B therefore constitute a positive pair, as depicted in the top part of FIG. 2. BEV images that do not correspond to the same RGBD image constitute negative pairs. The bottom part of FIG. 2 depicts third and fourth BEV images 104C, 104D, which are not associated with each other or with the first and second images 104A, 104B. For the four BEV images 104A, 104B, 104C, 104D depicted in FIG. 2, there are five negative pairs: the first image 104A paired with either one of the third and fourth images 104C, 104D, the second image 104B paired with either one of those images 104C, 104D and the third and fourth images 104C, 104D paired with each other. The aim of the contrastive learning task is to identify positive pairs whilst distinguishing negative pairs. Each BEV image 104A, 104B, 104C, 104D is processed by the encoder 100 based on the encoder weights w 1 in order to extract a set of features therefrom. A contrastive learning loss 101 is defined which encourages similarity of features between positively paired images whilst discouraging similarity of features between negatively paired images.

When positive image pairs are generated according to FIG. 1, this means that the encoder 100 is encouraged to extract similar features for corresponding object points in cropped and non-cropped BEV images. In other words, once trained, the presence or absence of non-object points in a BEV image should have minimal effect on the features that are assigned to object points; in assigning features to object points, the encoder is 100 is encouraged to consider only object points and disregard any non-object points that might be present.

The SimCLR approach of Chen et al. can be applied with positive/negative image pairs generated in accordance with FIG. 1. Following the notation of Chen et al., a pretext training set is denoted $\{\tilde{x}_k\}$ and a positive pair of images is denoted $\tilde{x}_i$, $\tilde{x}_j$. The encoder 100 is represented mathematically as a function $f(\cdot)$. For a CNN encoder architecture, $f$ typically involves a series of convolutions and non-linear transformations applied in accordance with the encoder weights $w_1$. The output representation of the encoder 100 is denoted $h_i=f(\tilde{x}_i)$ for a given input $\tilde{x}_i$. A small neural network projection head $g(\cdot)$ transforms the representation into a space in which the contrastive loss 101 is applied. The contrastive loss is defined between a given positive pair $\tilde{x}_i$, $\tilde{x}_j$ in minibatch of 2N images as:

$$\ell_{i,j} = -\log\frac{\exp(sim(z_i, z_j)/\tau)}{\sum_{k=1}^{2N}\mathbb{1}_{[k\neq i]}\exp(sim(z_i, z_k)/\tau)}, \quad (1)$$

where $z_i=g(h_i)$, $\tau$ is a constant, $sim(u, v)=u_T v/\|u\|\|v\|$ denotes the dot product between $l_2$ normalized u and v and an indicator function is $\mathbb{1}$ [k≠i] is 1 if k≠j and 0 otherwise. For pre-training, the loss is computed across all positive pairs in $\{\tilde{x}_k\}$, with the numerator in Equation (1) acting to encourage similarity of features between positively paired images $\tilde{x}_i$, $\tilde{x}_j$ and the denominator acting to discourage similarity of features between $\tilde{x}_i$ and all other images. The loss function of Equation 1 is a normalized temperature-scaled cross-entropy loss (NT-Xent). As will be appreciated, this is just one example of a viable contrastive loss that can be applied with paired images generated as per FIG. 1. Other contrastive learning approaches can be applied to paired images generated according to the present teaching.

Referring to FIG. 2, when $\tilde{x}i$ is the first image 104A, the second image 104B would be $\tilde{x}_j$; the first image 104A paired with the third image 104C and the first image 104A paired the fourth image 104D are negative pairs that contribute to the summation over negative pairs in the denominator for $\tilde{x}_i$.

Whilst the above considers RGBD point clouds (or, more generally, point clouds encoded in a depth or disparity image), the techniques are not limited in this respect. For point clouds of non-image modalities, such as lidar or radar, 2D object detection can still be leveraged when an image is captured simultaneously with the point cloud (at least approximately).

Figure 5:
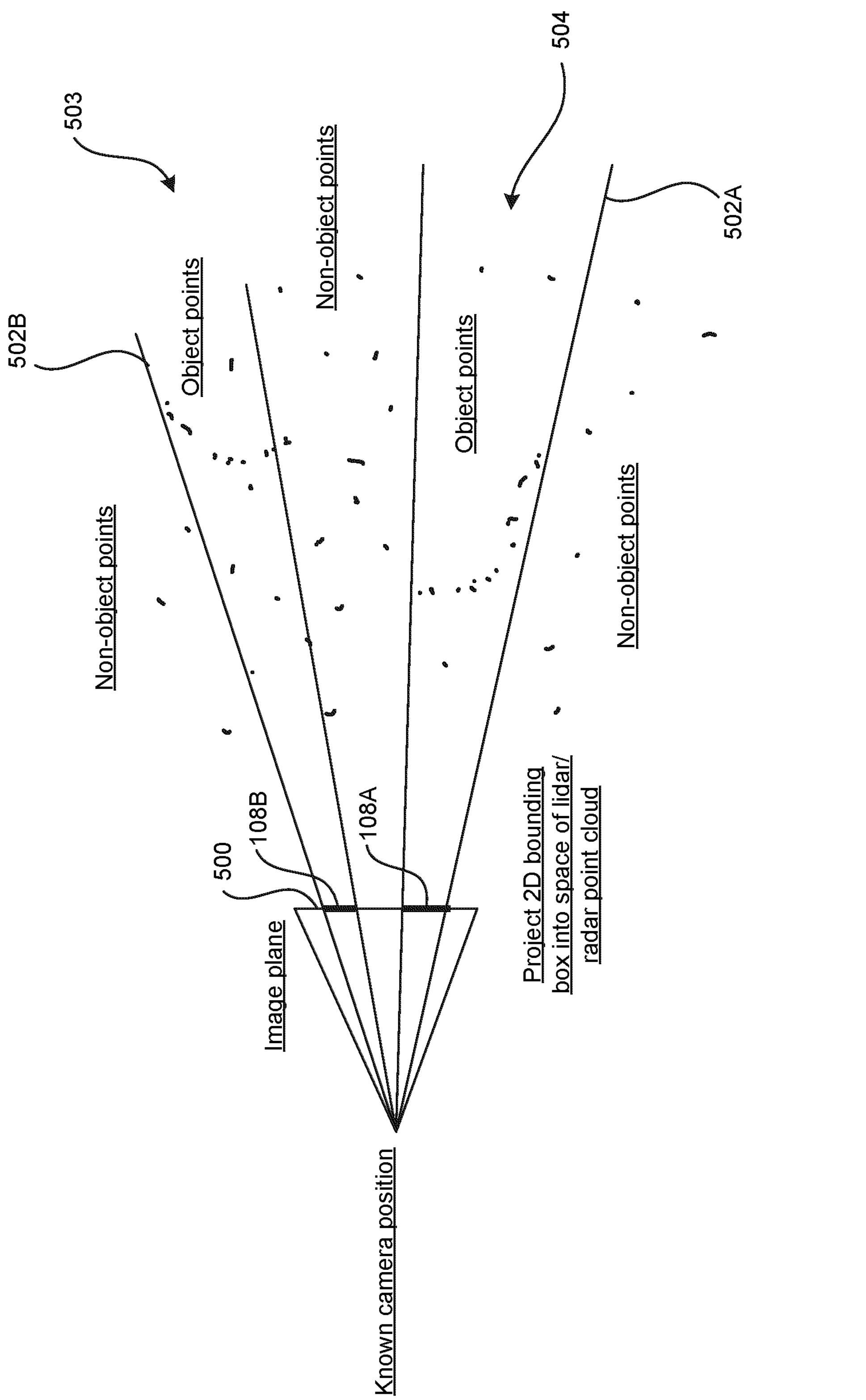
FIG. 5 shows how 2D bounding boxes detected an image can be projected into a 2D or 3D space of a lidar or radar point cloud.

FIG. 5 shows how 2D bounding boxes 108A, 108B, detected in the image plane 500 of an image, may be projected into the 2D or 3D space of an associated point cloud 503 of some other modality. The point cloud 503 has been captured approximately simultaneously with the image. Lidar point clouds are typically captured in 3D space. Radar point clouds are generally 2D and, in an autonomous vehicle context, a radar system would normally be arranged to capture spatial coordinates substantially parallel to the BEV plane based on range and azimuth measurement (although 3D radar systems are now available).

A vehicle may be equipped with at least one image sensor (camera) and at least one other sensor of a different modality, such as lidar or radar. The image sensor is registered with the other sensor. Therefore, a camera position and image plane 500 can be located in the space of the point cloud 503. Based on the known camera position, the 2D boxes 108A, 108B are projected into the space of the point cloud. The projected boxes, labelled 502A, 502B in FIG. 5, are 2D or 3D frustra in the space of the point. This, in turn, allows object points to be identified in the point cloud 503 as point lying within the relevant frustrum 502A, 502B. Background points are points lying outside of any frustra 502A, 502B.

Once object/background points have been identified in this manner, positive pairs can be generated for the non-RGBD point cloud 503 as described above, by selectively removing or transforming identified background points only.

To predict the 2D boxes 108A, 108B, the 2D object detector 106 is applied to the image as above. The image itself could be an RGBD image, but could also be a conventional colour (e.g. RGB) image in this case.

As noted, the described techniques can be applied to any sensor data representation, such as image or voxel representations, point clouds in 2D or 3D space etc. Training input can also comprise sensor data of multiple modalities, e.g., point clouds and images, or fused point clouds of different modalities.

If the encoder 100 is implemented with an ML architecture that operates directly on point clouds, such as PointNet, the original/cropped point clouds 103A, 103B of FIG. 1 could be used as a contrastive learning pair directly, without the "intermediate" discretised BEV representations 104A, 104B. In this case, optionally, randomized 2D or 3D background points can be injected into the second point cloud 104B, as per FIG. 1A. This also applies to other modalities of point clouds.

As an alternative to using the original point cloud 103A or its BEV image representation 104A, two cropped or otherwise transformed point clouds/BEV images could be used, each with different background noise.

As an alternative to removing background points, the background points could be distorted or otherwise transformed.

Whilst the above examples use 2D object detection to crop-out or transform background points, other transformations that leverage 2D object detection can be applied. For example, object points may be transformed leaving background points unchanged, or object points may be transformed in a different way to the background points and/or for different objects.

The principles can also be applied to synthetic sensor data, and it is noted that the term sensor data herein covers not only real sensor data but also synthetic sensor data generated using appropriate sensor model(s).

Figure 3:
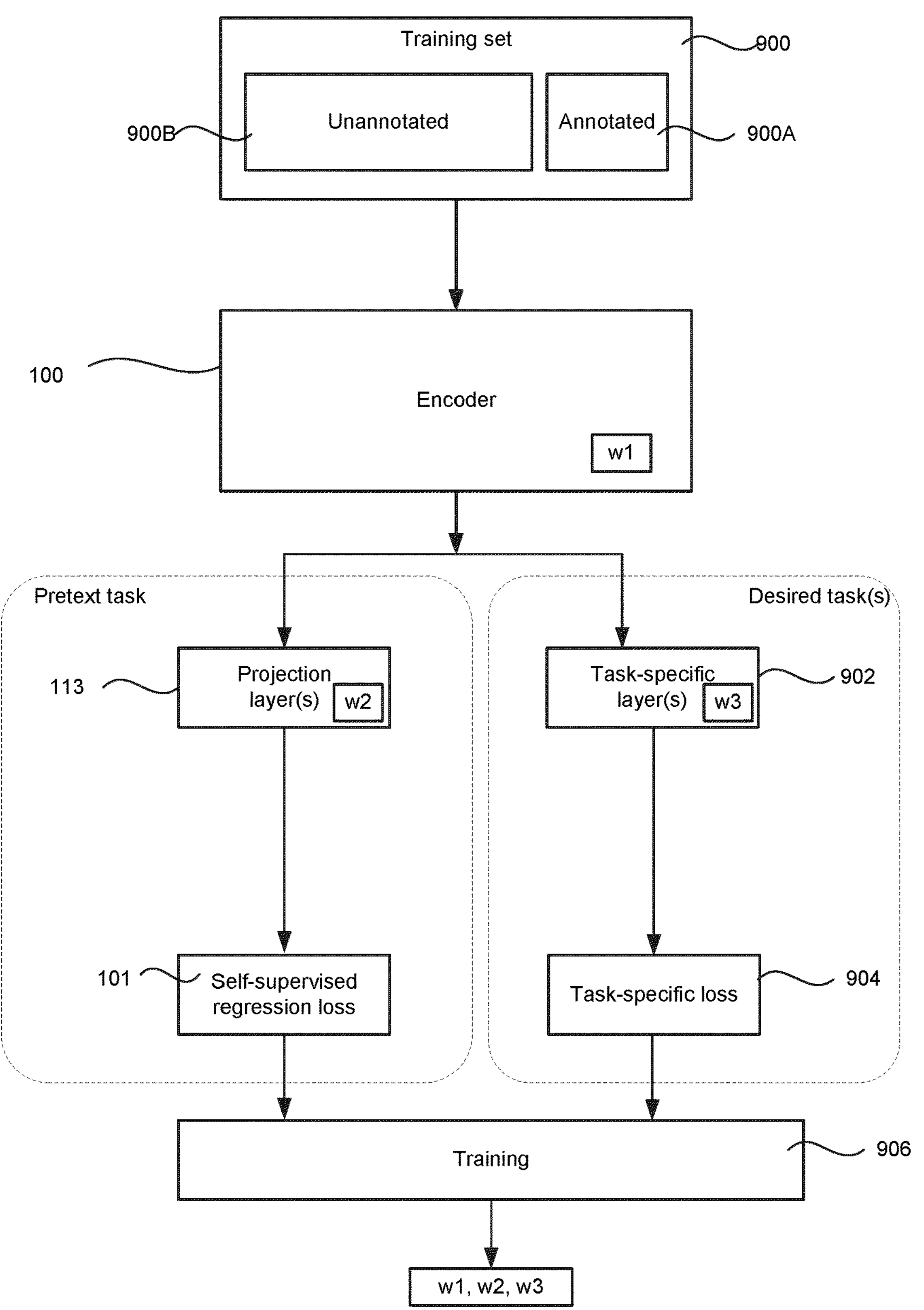
FIG. 3 shows a schematic block diagram for an interleaved training architecture.

FIG. 3 shows an example of a possible training architecture. In this example, instead of separate pre-training/fine-tuning phases, the training on the pretext task and the training on a desired task are interleaved. The pretext and desired tasks are trained 900 on a common training set in this example. However, only a relatively small subset 900A of the training set 900 is annotated with ground truth for the desired task (e.g., ground truth bounding boxes derived via manual annotation); the remaining subset 900B is unannotated and is only used for the self-supervised pretext training. The encoder 100 is shown connected to one or more projection layer(s) 113 (the projection head g). Additionally, the encoder 100 is also connected to one or more task-specific layer(s) 902 of a desired head, having learnable task-specific weights $w_3$. A conventional supervised loss 904 may be defined on the desired task(s), with the aim of minimizing the task-specific loss 904 with respect to the annotated subset 900A of the training data 900. A training component 906 is shown, which implements the training method as follows.

The projection component 113 projects features extracted by the encoder 100 from a feature space into a projection space to obtain first and second feature projections for the first and second images 104A, 104B respectively. The projection component 113 is implemented as one or more layers with projection weights $w_2$. The encoder weights $w_1$ and projection weights $w_2$ are learned simultaneously with each other in training on the pretext task. The projection component 113 can be implemented as a single layer with projection weights $w_2$. Whilst a single layer is sufficient, multiples layers can be used.

Training is performed in a sequence of training steps, each having two phases. In the first phase of each training step, a single update is applied the encoder weights $w_1$ and projection weights $w_2$ with the aim of optimizing the self-supervised pretext loss 101 over the full training set 900; then, in the second phase, a single update is applied to the task-specific weights $w_3$ with the aim of optimizing the task-specific loss 904 over the annotated subset 900A of the training set 900. In the second phase, the encoder weights $w_1$ may be frozen, or the encoder weights $w_1$ may be updated for a second time based on the task-specific loss 904, simultaneously with the task-specific weights $w_3$. In this manner, the task-specific training is "interleaved" with the pretext training.

As will be appreciated, this is just one example of a suitable shared learning training scheme. Alternatively, the encoder 100 and projection layer(s) 113 could be trained in an initial pre-training phase, followed by a fine-tuning phase in which the task-specific layer(s) 902 are trained. Alternatively, a multi-task loss could be constructed that combines the pretext and task-specific losses 101, 904 and all of the weights $w_1$, $w_2$, $w_3$ could be learned simultaneously though optimization of the multi-task loss.

Gradient descent (or ascent) is one example of a suitable training method that may be used.

In the above examples, the projection layer(s) 113 is learned, in the sense of having projection weights $w_2$ that are learned simultaneously with the encoder weights $w_1$ during training on the pretext task. The projection layer(s) 113 does not form part of the encoder 100 and the projection weights $w_2$ may be discarded once pretext training is complete. This architecture is useful to prevent the encoder weights $w_1$ from becoming overly sensitive to the pretext task. However, this may be context dependent and, in some cases, it may be possible to achieve good encoder performance with no projection layers. In a neural network architecture, the projection layer(s) 113 are any layer(s) that are discarded after pretext training (or, more precisely, which are not used for the purpose of the desired task(s)), and the encoder 100 means the remaining layers before the discarded/unused layer(s).

Figure 4:
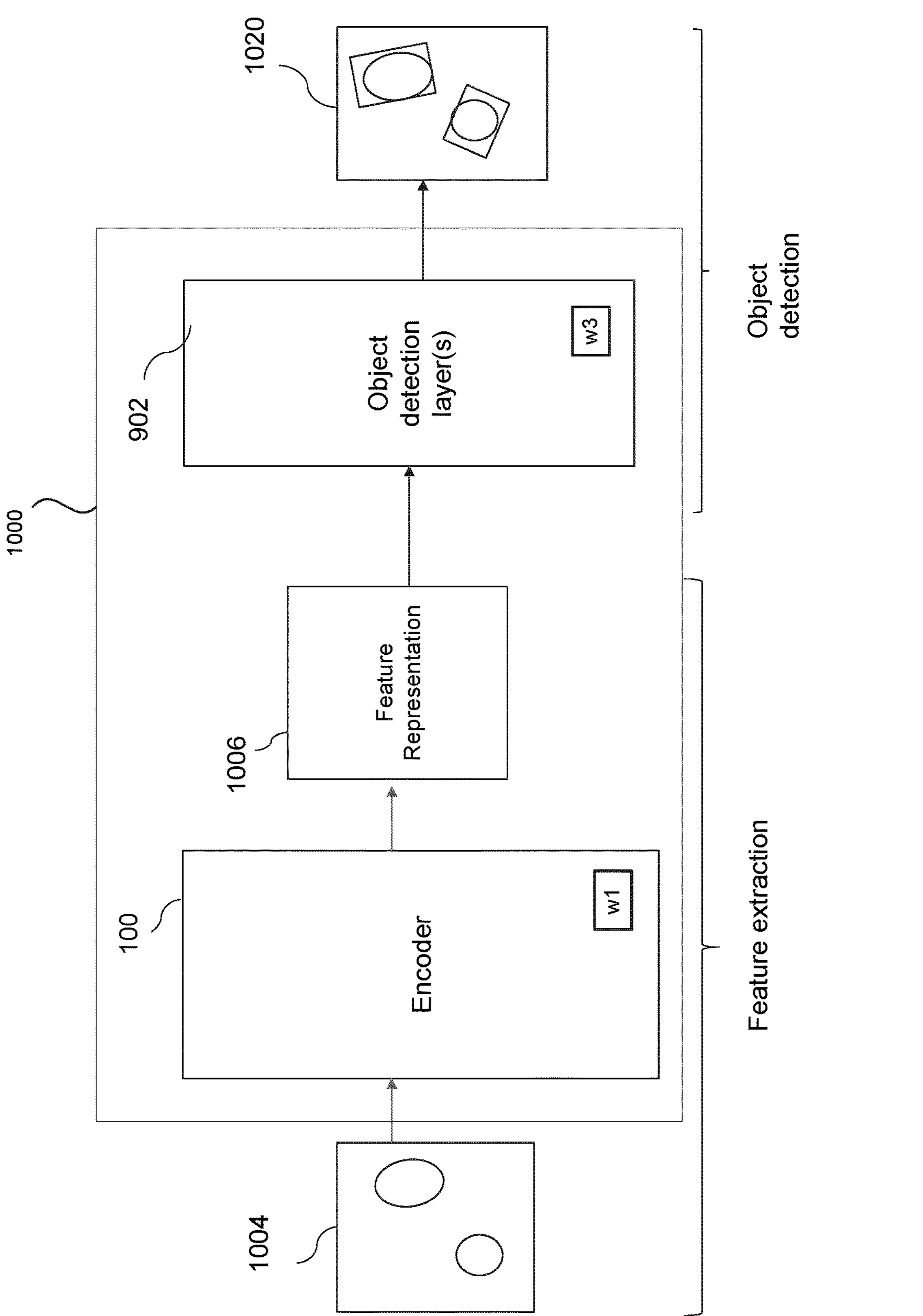
FIG. 4 shows a schematic block diagram of a computer system configured to implement a trained encoder.

FIG. 4 shows a computer system 100 configured to implement the trained encoder 100 for a bounding box detection task. An input image or other data representation 1004 is input to the trained encoder 100. A feature representation 1006 is extracted by the trained encoder 100 and passed to the trained task-specific layer(s) 902, which have been trained as a bounding box detector in this example. The encoder 100 and task-specific layers 902 operate on their inputs as described above in the context of training. The difference is that the weights $w_1$, $w_3$ have been learned by this point such that the encoder 100 and object detector 902 are now performing useful tasks. The task-specific layer(s) 902 output a set of object predictions, in the form of predicted bounding boxes 1020. It will be appreciated this is merely one example of a practical application of the trained encoder 100. The task-specific layers 902 can be trained to use the features for any desired task.

The feature representation 1006 represents features in the same way as training. For example, during training and in the trained system, extracted features may be contained in a feature map having F-channels (the dimensionality of the feature space). Such a feature map encodes local features that corresponds to respective regions of the original input (e.g., pixels, points, 2D or 3D grid cells, or areas/volumes more generally).

Whilst FIG. 4 considers a bounding box detector 902, this is merely one example of a perception component that can use extracted features. Examples of perception methods include object or scene classification, orientation or position detection (with or without box detection or extent detection more generally), instance or class segmentation etc., any of which can be implemented using feature representations learned in accordance with the present teaching.

Herein, the term "perception" refers generally to methods for recognizing patterns exhibited in sensor data representations, such as images, point clouds, voxel representations, mesh representations etc. State-of-the-art perception methods are typically ML-based, and many state-of-the art perception method use deep convolutional neural networks (CNNs). Pattern recognition has a wide range of applications including object detection/localization, object/scene recognition/classification, instance segmentation etc.

Object detection and object localization are used interchangeably herein to refer to techniques for locating objects in point clouds and other data representations in a broad sense; this includes 2D or 3D bounding box detection, but also encompasses the detection of object location and/or object pose (with or without full bounding box detection), and the identification of object clusters. Object detection/localization may or may not additionally classify objects that have been located (for the avoidance of doubt, whilst, in the field of machine leaning, the term "object detection" sometimes implies that bounding boxes are detected and additionally labelled with object classes, the term is used in a broader sense herein that does not necessarily imply object classification or bounding box detection).

References herein to components, functions, modules and the like, denote functional components of a computer system which may be implemented at the hardware level in various ways. This includes the encoder 100, the projection layer(s) 113, the task-specific layer(s) 902, the training component 906 and the other components depicted in FIGS. 1 to 4. Such components may be implemented in a suitably configured computer system. A computer system comprises one or more computers that may be programmable or non-programmable. A computer comprises one or more processors which carry out the functionality of the aforementioned functional components. A processor can take the form of a general-purpose processor such as a CPU (Central Processing unit) or accelerator (e.g. GPU) etc. or more specialized form of hardware processor such as an FPGA (Field Programmable Gate Array) or ASIC (Application-Specific Integrated Circuit). That is, a processor may be programmable (e.g. an instruction-based general-purpose processor, FPGA etc.) or non-programmable (e.g. an ASIC). Such a computer system may be implemented in an onboard or offboard context in the context of fully/semi-autonomous vehicles and mobile robots. Training may be performed in the same or a different computer system to that in which the trained components are deployed. Training of modern deep networks will typically be carried out using GPUs or other accelerator processors.

References is made to ML models, such as CNNs or other neural networks. This terminology refers to a component (software, hardware, or any combination thereof) configured to implement ML techniques.

The invention claimed is:

1. A computer implemented method comprising:

training a machine learning (ML) system based on a self-supervised loss function applied to a training set, the ML system comprising an encoder, wherein the training set comprises first data representations and corresponding second data representations, wherein the encoder extracts features from each first and second data representation, and wherein the self-supervised loss function is configured to cause the ML system to learn feature representations such that each first data representation is more similar to its corresponding second data representation, based on their respective features, extracted by the encoder, than to non-corresponding data representations, wherein each first data representation and its corresponding second data representation represent a common set of sensor data; and generating at least the second data representation, including applying a two-dimensional (2D) object detector to an image other than the first and second data representations, wherein the image contains or is associated with the common set of sensor data, and transforming the common set of sensor data based on one or more objects detected in the image, the common set of sensor data comprising point cloud data or other non-image data, the second data representation representing the transformed common set of sensor data, wherein the common set of sensor data comprises a point cloud encoded in a depth channel of the image and thus represented in a 2D image plane of the image, wherein the first and second data representations represent the point cloud in a 2D plane other than the 2D image plane of the image, and wherein the 2D plane is a bird's-eye view plane lying substantially perpendicular to the 2D image plane.

2. The method of claim 1, wherein the first and second data representations are discretised image representation of the point cloud in the 2D plane that optionally include respective height channels.

3. The method of claim 1, wherein the common set of sensor data comprises the point cloud encoded in the depth channel of the image and thus represented in the 2D image plane of the image, wherein the first and second data representations represent the point cloud in three-dimensional (3D) space.

4. The method of claim 3, wherein the first and second data representations are discretised voxel representations of the point cloud in the 3D space, or non-discretised representations of the point cloud in the 3D space.

5. The method of claim 1, wherein the image has been captured substantially simultaneously with the common set of sensor data, the sensor data of a non-image modality; wherein each detected object is matched with a corresponding subset of the common set of sensor data in order to transform the common set of sensor data.

6. The method of claim 5, wherein the common set of sensor data comprises a point cloud not encoded in the image.

7. The method of claim 6, wherein the point cloud has the non-image modality.

8. The method of claim 1, wherein the common set of sensor data is transformed by removing or distorting background sensor data that does not belong to any detected object.

9. The method of claim 8, wherein the 2D object detector computes a 2D bounding box for each detected object, wherein the background sensor data is identified as sensor data contained in or associated with a background region of the image outside of any 2D bounding box.

10. The method of claim 8, wherein the background sensor data is fully or partially removed and replaced with random noise.

11. The method of claim 1, wherein the ML system comprises a trainable projection component which projects the features from a feature space into a projection space, the self-supervised loss defined on the projected features, wherein the trainable projection component is trained simultaneously with the encoder.

12. The method of claim 1, wherein each set of sensor data captures a static or dynamic driving scene.

13. The method of claim 1, wherein the common set of sensor data comprises:

three-dimensional (3D) spatial data, or 2D spatial data in the 2D plane other than an image plane of the image.

14. The method of claim 1, wherein the 2D object detector is a trained machine learning (ML) 2D object detector, whereby knowledge learned in the training of the 2D ML object detector is transferred to the encoder during the training based on the self-supervised loss function.

15. A computer system comprising:

at least one memory configured to store computer-readable instructions;

at least one hardware processor coupled to the at least one memory and configured to execute the computer-readable instructions, which upon execution cause the at least one hardware processor to perform operations including:

training a machine learning (ML) system based on a self-supervised loss function applied to a training set, the ML system comprising an encoder, wherein the training set comprises first data representations and corresponding second data representations, wherein the encoder is configured to extract features from each first and second data representation, and wherein the self-supervised loss function is configured to cause the ML system to learn feature representations such that each first data representation is more similar to its corresponding second data representation, based on their respective features extracted by the encoder, than to non-corresponding data representations, wherein each first data representation and its corresponding second data representation represent a common set of sensor data; and generating at least the second data representation, including applying a two-dimensional (2D) object detector to an image other than the first and second data representations, wherein the image contains or is associated with the common set of sensor data, and transforming the common set of sensor data based one or more objects detected in the image, the common set of sensor data comprising point cloud data or other non-image data, the second data representation representing the transformed common set of sensor data, wherein the common set of sensor data comprises a point cloud encoded in a depth channel of the image and thus represented in a 2D image plane of the image, wherein the first and second data representations represent the point cloud in a 2D plane other than the image plane of the image, and wherein the 2D plane is a bird's-eye view plane lying substantially perpendicular to the 2D image plane.

16. The computer system of claim 15, wherein the at least one hardware processor is configured to implement a perception component, wherein the encoder is configured to receive an input sensor data representation and extract features therefrom, and wherein the perception component is configured to use the extracted features to interpret the input sensor data representation.

17. A non-transitory medium embodying computer-readable instructions configured, when executed on one or more hardware processors, to cause the one or more hardware processors to perform operations including:

training a machine learning (ML) system based on a self-supervised loss function applied to a training set, the ML system comprising an encoder, wherein the training set comprises first data representations and corresponding second data representations, wherein the encoder extracts features from each first and second data representation, and wherein the self-supervised loss function encourages the ML system to associate each first data representation with its corresponding second data representation based on their respective features, wherein each first data representation and its corresponding second data representation represent a common set of sensor data; and generating at least the second data representation including applying a two-dimensional (2D) object detector to an image other than the first and second data representations, wherein the image contains or is associated with the common set of sensor data, and transforming the common set of sensor data based one or more objects detected in the image, the common set of sensor data comprising point cloud data or other non-image data, the second data representation representing the transformed common set of sensor data, wherein the common set of sensor data comprises a point cloud encoded in a depth channel of the image and thus represented in a 2D image plane of the image, wherein the first and second data representations represent the point cloud in a 2D plane other than the image plane of the image, and wherein the 2D plane is a bird's-eye view plane lying substantially perpendicular to the 2D image plane.

* * * * *